(12) United States Patent
Chase et al.

(10) Patent No.: US 10,077,559 B2
(45) Date of Patent: Sep. 18, 2018

(54) RETRACTABLE AWNING AND WINDOW FRAME ASSEMBLY

(71) Applicant: Composite Solutions, Inc., Junction City, OR (US)

(72) Inventors: Jeffrey Chase, Junction City, OR (US); Dennis Dame, Harrisburg, OR (US); Benjamin Chase, Eugene, OR (US); Stefan Crabtree, Coburg, OR (US)

(73) Assignee: Composite Solutions, Inc., Eugene, OR (US)

( * ) Notice: Subject to any disclaimer, the term of this patent is extended or adjusted under 35 U.S.C. 154(b) by 0 days.

(21) Appl. No.: 15/179,586

(22) Filed: Jun. 10, 2016

(65) Prior Publication Data
US 2016/0362039 A1 Dec. 15, 2016

(51) Int. Cl.
*E04F 10/06* (2006.01)
*E04F 10/02* (2006.01)
*B60P 3/34* (2006.01)

(52) U.S. Cl.
CPC .......... *E04F 10/0614* (2013.01); *E04F 10/02* (2013.01); *E04F 10/0603* (2013.01); *E04F 10/0625* (2013.01); *B60P 3/343* (2013.01)

(58) Field of Classification Search
CPC ....... E04F 10/06; E04F 10/0614; E04F 10/02; E04F 10/0603; E04F 10/0625; B60P 3/343
USPC ........................................................ 296/163
See application file for complete search history.

(56) References Cited

U.S. PATENT DOCUMENTS

| | | | |
|---|---|---|---|
| 1,775,857 A | 9/1930 | Highsmith | |
| 1,976,708 A * | 10/1934 | Anderson | E04F 10/02 160/370 |
| 1,980,991 A | 11/1934 | Gronbech | |
| 2,066,227 A * | 12/1936 | Reukauf, Jr. | E04F 10/02 160/81 |
| 2,579,780 A * | 12/1951 | Atwood | E04F 10/02 135/909 |
| 3,053,317 A * | 9/1962 | Benson | E04F 10/02 160/328 |
| 3,722,571 A | 3/1973 | Knight et al. | |
| 3,923,074 A | 12/1975 | McKee | |
| 3,955,611 A * | 5/1976 | Coles | B60P 3/343 160/243 |

(Continued)

FOREIGN PATENT DOCUMENTS

| | | | | |
|---|---|---|---|---|
| CN | 205712811 U | * | 11/2016 | |
| DE | 19622158 A1 | * | 12/1996 | ............. B60P 3/343 |
| JP | 2012072581 | | 4/2012 | |

*Primary Examiner* — Hilary L Gutman
(74) *Attorney, Agent, or Firm* — Klarquist Sparkman, LLP (57) ABSTRACT

An awning assembly includes a frame having a U-shaped recess, and first and second support arms having first end portions pivotably mounted within the recess. The assembly further includes a shaft, and an awning supported on the shaft. The first and second support arms have second end portions connected to the awning or to the shaft. The awning is movable by the support arms between a retracted position and an extended position. When the awning is in the retracted position, the awning is in a rolled-up or collapsed configuration and the second end portions of the support arms and the awning are disposed within the recess. When the awning is moved from the retracted position to the extended position, the second end portions of the support arms pivot out of the recess and unfurl the awning.

19 Claims, 8 Drawing Sheets

(56) References Cited

U.S. PATENT DOCUMENTS

| | | | | |
|---|---|---|---|---|
| 4,164,972 A * | 8/1979 | Bennett | ............ | B60P 3/343 135/88.12 |
| 4,180,117 A * | 12/1979 | Greer | ............ | B60P 3/343 160/67 |
| 4,331,169 A * | 5/1982 | Bonser | ............ | B60P 3/343 135/88.12 |
| 4,474,403 A * | 10/1984 | Miller | ............ | B60P 3/343 16/362 |
| 4,759,396 A * | 7/1988 | Quinn | ............ | E04F 10/0614 135/88.12 |
| 4,819,706 A * | 4/1989 | Quinn | ............ | B60P 3/343 160/301 |
| 4,819,707 A * | 4/1989 | Watson | ............ | B60P 3/343 160/305 |
| 4,862,940 A * | 9/1989 | Atchison | ............ | B60P 3/343 160/23.1 |
| 4,941,524 A * | 7/1990 | Greer | ............ | B60P 3/343 160/67 |
| 5,038,087 A * | 8/1991 | Archer | ............ | E06B 9/88 160/310 |
| 5,192,111 A * | 3/1993 | Hanemaayer | ............ | B60P 3/343 135/88.1 |
| 6,021,834 A * | 2/2000 | Malott | ............ | E04F 10/0603 135/88.1 |
| 6,021,835 A * | 2/2000 | Malott | ............ | E04F 10/0603 135/88.1 |
| 6,089,306 A * | 7/2000 | Frey, Jr. | ............ | E04F 10/0614 160/300 |
| 6,142,209 A | 11/2000 | Girard | | |
| 6,260,909 B1 * | 7/2001 | Crean | ............ | E04F 10/0633 135/88.01 |
| 6,273,172 B1 * | 8/2001 | Frey | ............ | E04F 10/0614 135/88.12 |
| 6,619,726 B2 * | 9/2003 | Jones | ............ | B60P 3/343 135/88.12 |
| 6,860,544 B2 | 3/2005 | Malott | | |
| 7,086,684 B2 | 8/2006 | Glaser et al. | | |
| 7,234,753 B2 * | 6/2007 | Held | ............ | B60J 7/12 296/100.18 |
| 7,798,547 B2 * | 9/2010 | Antaya | ............ | B05B 15/1214 296/163 |
| 8,639,387 B2 | 1/2014 | Byberg et al. | | |
| 9,834,952 B1 * | 12/2017 | Meyers | ............ | E04H 15/08 |
| 2005/0022942 A1 * | 2/2005 | Heitel | ............ | E04F 10/0685 160/22 |
| 2005/0269037 A1 * | 12/2005 | Weddell | ............ | B60P 3/34 160/22 |
| 2006/0163905 A1 * | 7/2006 | Held | ............ | B62D 33/06 296/102 |
| 2007/0246092 A1 * | 10/2007 | Gerrie | ............ | B60J 7/067 135/88.07 |
| 2014/0232147 A1 * | 8/2014 | Held | ............ | B60J 7/0015 296/210 |

\* cited by examiner

RETRACTABLE AWNING AND WINDOW FRAME ASSEMBLY

CROSS REFERENCE TO RELATED APPLICATION

This application claims the benefit of U.S. Provisional Patent Application No. 62/174,438, filed Jun. 11, 2015, which is incorporated herein by reference in its entirety.

FIELD

The present disclosure relates to an awning and window frame assembly that can be installed, for example, in the wall of a vehicle.

BACKGROUND

It is common for manufacturers of recreational vehicles (RV's) to mount retractable awnings on the side walls of an RV adjacent the windows. However, a conventional style awning is unsightly and detracts from the overall streamlined appearance of the RV. Thus, it would be desirable to provide an awning assembly for an RV or similar vehicle that blends more seamlessly into the surrounding structure and does not detract from the streamlined appearance of the vehicle.

SUMMARY

The disclosure concerns embodiments of an awning assembly. In a representative embodiment, an awning assembly comprises a frame comprising a U-shaped recess, and first and second support arms having first end portions pivotably mounted within the recess. The assembly further comprises a shaft, and an awning supported on the shaft. The first and second support arms have second end portions connected to the awning or to the shaft. The awning is movable by the support arms between a retracted position and an extended position. When the awning is in the retracted position, the awning is in a rolled-up or collapsed configuration and the second end portions of the support arms and the awning are disposed within the recess. When the awning is moved from the retracted position to the extended position, the second end portions of the support arms pivot out of the recess and unfurl the awning.

In another representative embodiment, an awning assembly comprises a housing defining a recess, first and second support arms having end portions mounted within the recess, and an awning having a longitudinal edge fixedly secured within the recess. The first and second support arms are positioned on respective sides of the awning and connected to the awning, and the awning is movable by the support arms between a retracted position and an extended position. When the awning is in the retracted position, the awning is in a rolled-up or collapsed configuration and the support arms and the awning are disposed within the recess, and when the awning is moved from the retracted position to the extended position, the support arms extend out of the recess and unfurl or expand the awning.

In another representative embodiment, a method comprises installing an awning assembly in a wall of a vehicle, the awning assembly including a frame comprising a U-shaped recess, first and second support arms having lower end portions pivotably mounted within the recess, and a shaft. The awning assembly further includes an awning supported on the shaft, wherein the first and second support arms have upper end portions connected to the awning or to the shaft. The awning is movable by the support arms between a retracted position and an extended position. When the awning is in the retracted position, the awning is in a rolled-up or collapsed configuration and the upper end portions of the support arms and the awning are disposed within the recess, and when the awning is moved from the retracted position to the extended position, the upper end portions of the support arms pivot out of the recess and unfurl the awning.

The foregoing and other objects, features, and advantages of the disclosed technology will become more apparent from the following detailed description, which proceeds with reference to the accompanying figures.

DETAILED DESCRIPTION

The present disclosure concerns embodiments of awning and window frame assemblies that can be installed in a wall of a vehicle. As used herein, the term "vehicle" refers generally to any vehicle that has a power source (e.g., motor or engine) or a towable vehicle that is coupled to a driven vehicle for travelling from place to place. A vehicle can include, without limitation, a tractor-trailer, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of awning and window frame assemblies disclosed herein can also be installed in less mobile structures, such as mobile homes, house boats, mobile offices or command centers. If desired, the awning and window frame assemblies can be installed in permanent structures, such as houses, stores, etc.

Figures 1, 2:
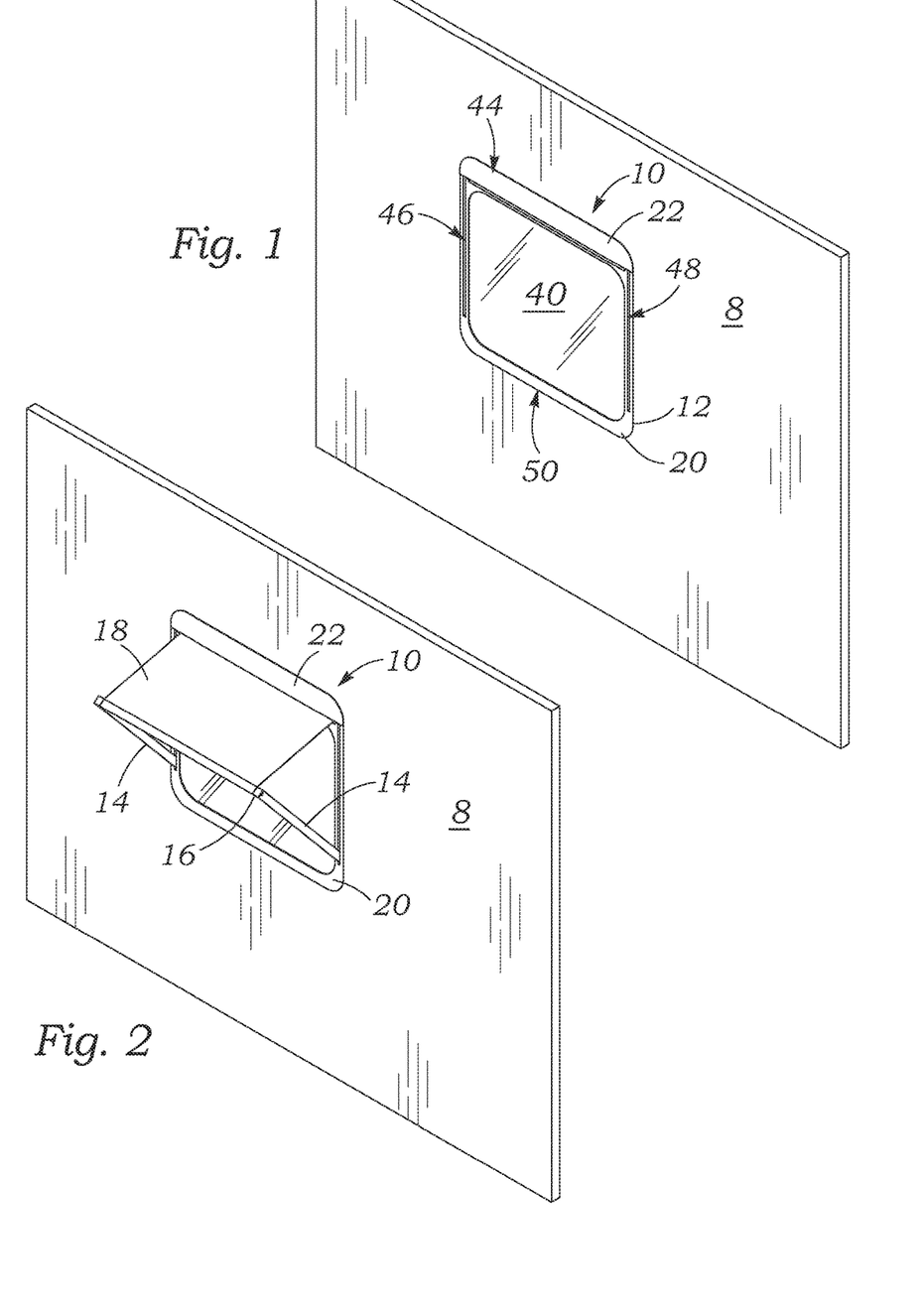
FIG. 1 shows an awning and window frame assembly installed in a vehicle wall with the awning shown in the retracted position, according to one embodiment.
FIG. 2 shows the awning and window frame assembly of FIG. 1 with the awning shown in the extended position.

Referring first to FIGS. 1 and 2, there is a shown an awning and window frame assembly 10 installed in a vehicle wall 8, according to one embodiment. The vehicle wall 8 can be the side wall of an RV, for example, or the outer front wall of a retractable/extendable slide-room that is installed within the vehicle wall. FIG. 1 shows the assembly 10 in a retracted position and FIG. 2 shows the assembly 10 in the extended position.

Figure 3:
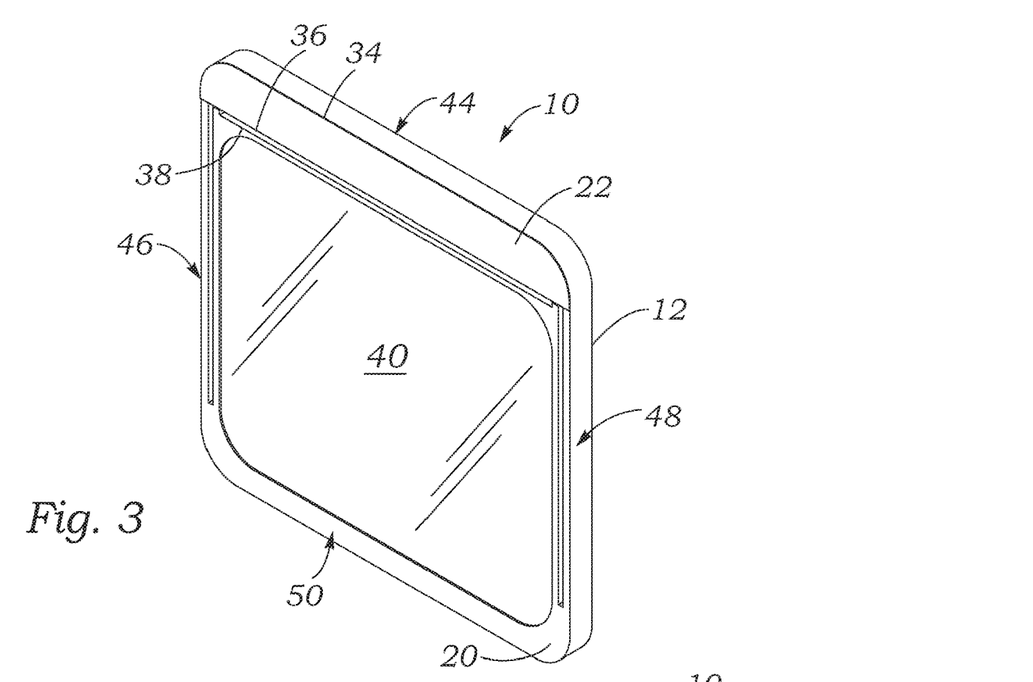
FIG. 3 is a perspective view of the awning and window frame assembly of FIG. 1 shown removed from the vehicle wall.
Figure 4:
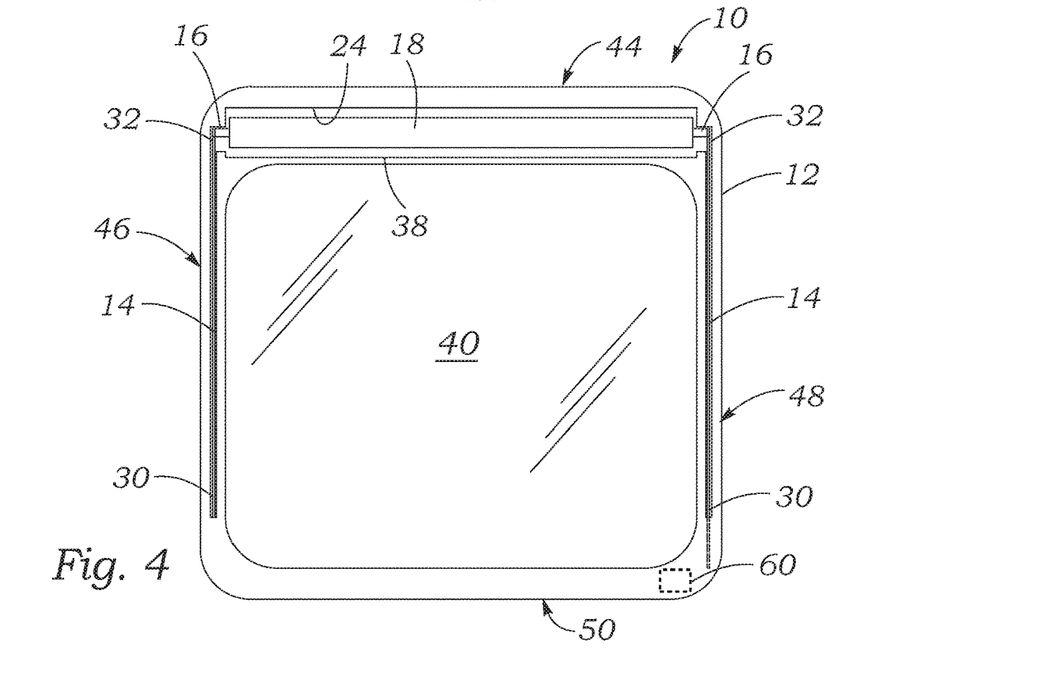
FIG. 4 is a front elevation view of the awning and window frame assembly of FIG. 3.
Figure 5:
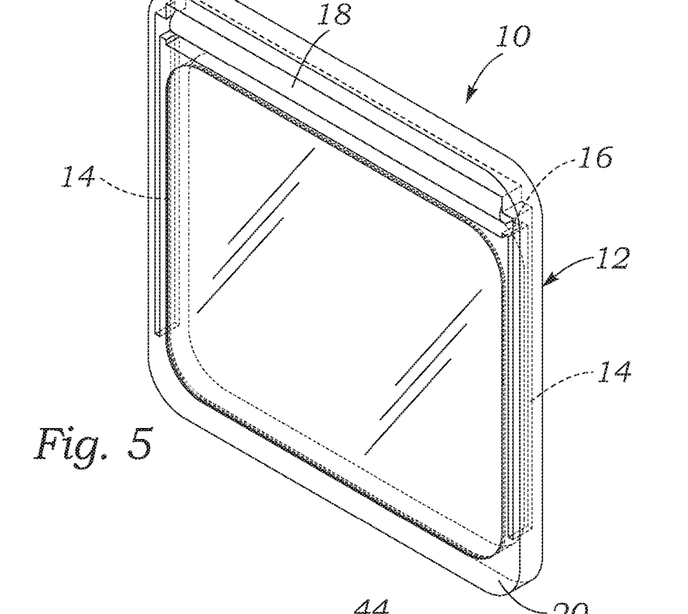
FIG. 5 is a perspective view of the awning and window frame assembly of FIG. 3.

Referring also to FIGS. 3-8, the assembly 10 comprises a frame 12, two pivotable support arms 14, a shaft 16 (FIGS. 2 and 4) extending between and connected to the upper ends of the support arms 14, and an awning 18 supported on the shaft 16. The frame 12 can include an upper portion 44, respective side portions 46, 48 and a lower portion 50 such that the frame defines an area in which to receive a window pane 40 (e.g., a glass or plastic window pane). As shown in FIGS. 1 and 2, the frame 12 desirably is mounted within an opening in the vehicle wall 8 such that a front face or surface 20 of the frame 12 is flush with the exterior surface of the vehicle wall 8. The assembly 10 can further comprise a cover 22 that extends over and hides the awning 18 from view when it is in the retracted position, as depicted in FIGS. 1 and 3. FIG. 4 shows the assembly 10 with the cover 22 removed for purposes of illustration.

The assembly 10 also can include mechanisms that are configured to retain the awning in the extent state and/or effect automatic extension and retraction of the awning, such as one or more electric motors 60 (FIG. 4) configured to move support arms inwardly and outwardly relative to the frame 12. These mechanisms can be housed in the frame 12. In alternative embodiments, the awning can also be actuated manually (e.g., with a handle accessible from inside the vehicle), pneumatically, or hydraulically.

The first recessed portion 24 is sized and shaped to receive the shaft 16 and the awning 18. Each of the second and third recessed portions 26, 28 are sized and shaped to receive one of the support arms 14. Each of the recessed portions 24, 26, 28 desirably has a depth greater than the support arms 14, the shaft 16, and the awning 18 such that when the awning is in the retracted and/or rolled-up position, these components are completely within the recessed portions and do not extend beyond the outer surface 20 of the frame 12.

Figure 6:
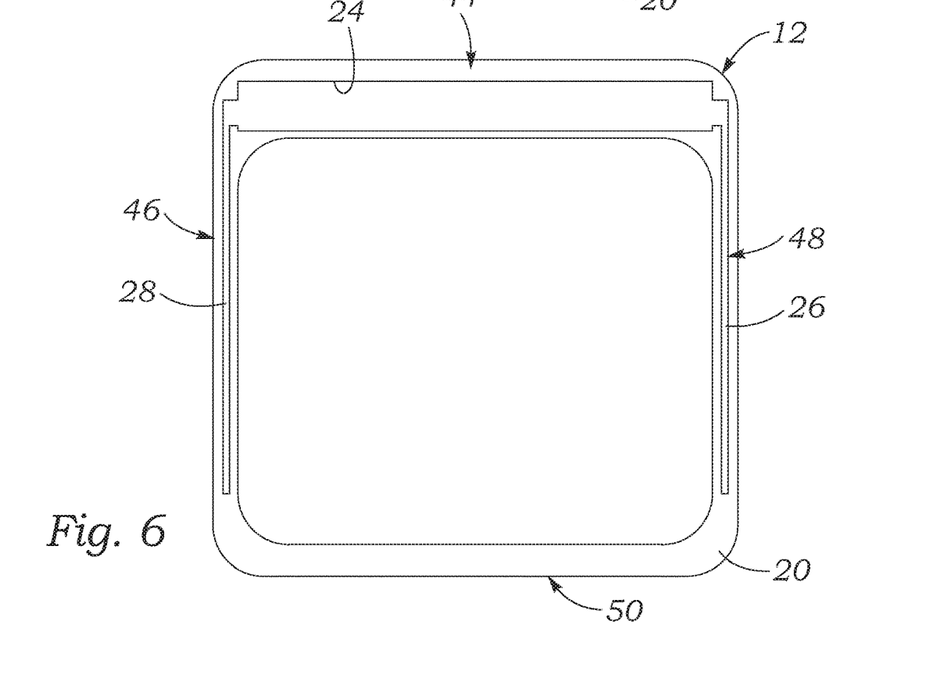
FIG. 6 is a front elevation view of the frame of the assembly of FIG. 3
Figure 7:
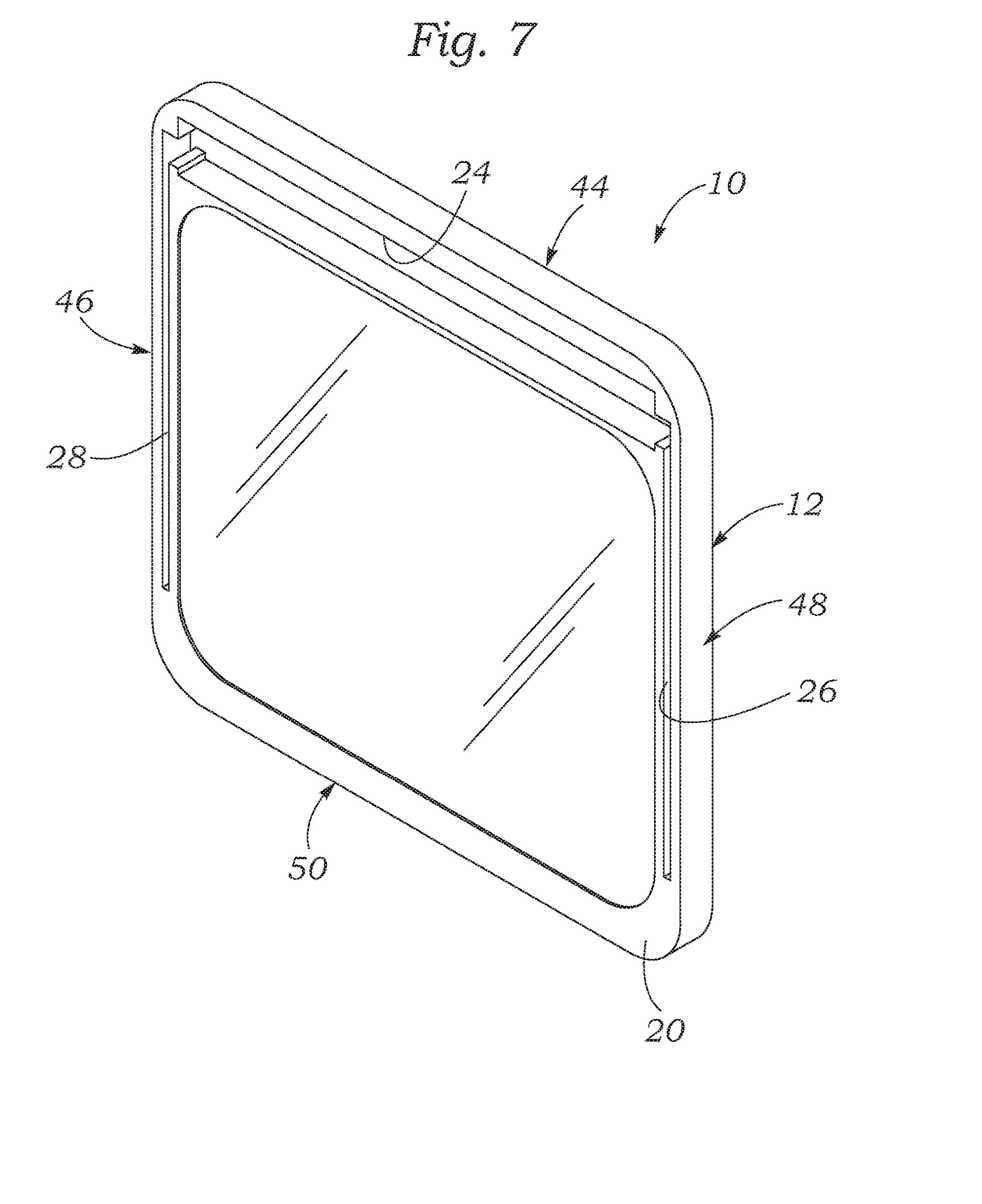
FIG. 7 is a perspective view of the frame shown in FIG. 6.

In the embodiment of FIGS. 1-8, each support arm 14 has a lower end portion 30 that is pivotably mounted within a respective recessed portion 26, 28 (FIGS. 6 and 7). With reference to FIG. 4, each support arm 14 has an upper end portion 32 that can support an adjacent end portion of the shaft 16 for rotatable movement of the shaft about its longitudinal axis. When the awning is in the retracted position, the awning 18 can be rolled up around the shaft and the outermost longitudinal edge of the awning can be fixedly secured inside of the first recessed portion 24. To extend the awning, the support arms 14 are pivoted outwardly away from the frame 12, which pull the shaft 16 out of the frame, causing the awning 18 to unfurl from the rolled-up configuration, as shown in FIG. 2.

Figure 8:
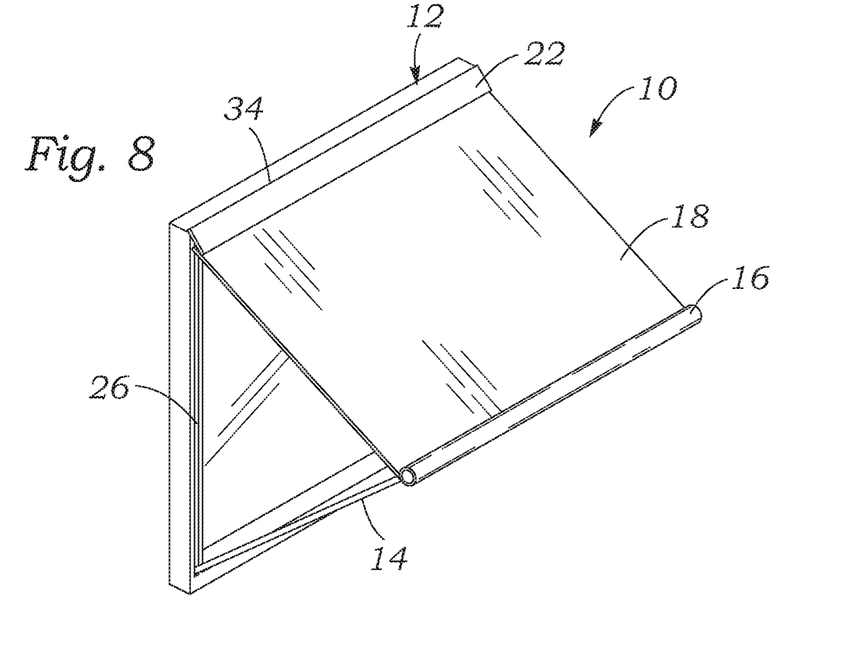
FIG. 8 is a perspective view of the awning assembly of FIG. 2 including a movable cover.

FIG. 8 illustrates another configuration of the window frame assembly 10 similar to the embodiment of FIG. 2, wherein the cover 22 is movable with respect to the frame. More specifically, in the embodiment shown, an upper edge 34 of the cover 22 can be pivotably connected to the frame 12 by one or more hinges (not shown) that allow the cover 22 to pivot away from the frame and allow the shaft 16 and the rolled-up awning 18 to pivot outwardly from the recessed portion 24 toward the extended position.

Figure 9:
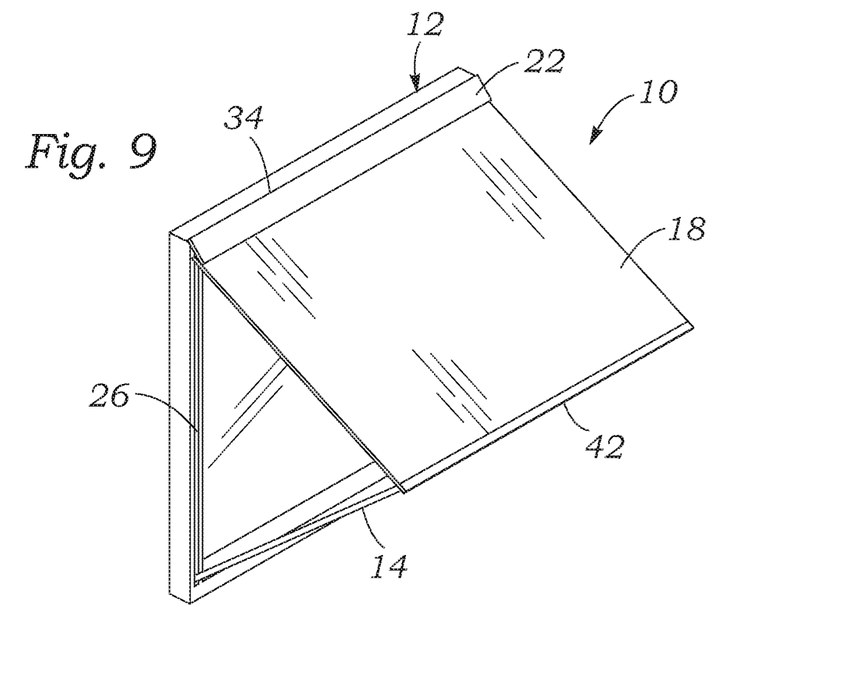
FIG. 9 is a perspective view of an alternative embodiment of the awning assembly of FIG. 2 with a cross member extending between upper end portions of the support arms.

In alternative embodiments such as the embodiment illustrated in FIG. 9, the outermost longitudinal edge of the awning 18 can be fixedly secured to the upper end portions 32 of the support arms 14 and the ends of the shaft 16 can be rotatably mounted to the frame 12 inside of recessed portion 24. In the illustrated embodiment, a rigid support bar or cross member 42 can extend between and be connected to the second end portions of the support arms 14, and the outer longitudinal edge of the awning 18 can be secured to the cross member to reinforce the edge of the awning. In this configuration, pivoting the support arms 14 outwardly away from the frame 12 pulls the longitudinal edge of awning out of the recessed portion 24 while the shaft 16 remains inside of the recessed portion 24, causing the awning to unfurl from the rolled-up configuration.

Since the shaft 16 remains within the recessed portion 24 during extension of the awning, the cover 22 need not include a pivotable or hinged connection along its upper edge 34. Instead, with reference to FIG. 3, a lower edge 36 of the cover 22 can be spaced slightly above a lower edge 38 of the recessed portion 24, providing a small slot between the edges 36, 38 through which the awning can pass as it is being unfurled from the shaft 16. The window frame can include the slot between the edges 36, 38 both in configurations where the cover 22 is pivotable, and where the cover is fixed. In further alternative embodiments, the cover 22 can be movable upwardly or downwardly with respect the upper portion 44 of the frame to uncover the recessed portion 24 and allow the awning to unfurl. The cover 22 can also be flexible such that contact with the awning 18 causes the cover 22 to bend and allow the awning to move from the retracted position to the extended position and vice versa. The cover 22 can also completely cover the recess 24, and can define an opening through which the awning can pass as it is unfurled.

The assembly 10 also can include mechanisms that are configured to retain the awning in the extended state and/or effect automatic extension and retraction of the awning, such as one or more electric motors configured to move the support arms inwardly and outwardly relative to the frame 12. These mechanisms can be housed in the frame 12. In alternative embodiments, the awning can also be actuated manually (e.g., with a handle accessible from inside the vehicle), pneumatically, or hydraulically.

In the retracted position, the rolled-up awning 18 is mostly or entirely hidden from view behind the cover 22 (see FIG. 3). Also, as mentioned above, the outer surface of the frame 12 is flush with the exterior surface of the vehicle wall 8 and the support arms 14 and the awning 18 are disposed completely within the frame 12. As such, the support arms and the awning do not extend beyond the outer surface of the frame 12 or the exterior surface of the vehicle wall 8. Advantageously, the entire assembly 10 blends well into the surrounding vehicle wall 8 and does not detract from the overall streamlined appearance of the vehicle. In particular, when the awning is retracted, the movable components of the assembly are mostly hidden from view.

The assembly 10 can be used to mount a retractable awning at locations on a vehicle other than at a location adjacent a window. For example, the assembly 10 can be adapted to be mounted adjacent a door, in which case the frame 12 can have a central opening for mounting a door. In other implementations, the assembly can be mounted within a section of a wall without a window or door, in which case the frame 12 need not include a central opening for supporting a window or door.

Figure 10:
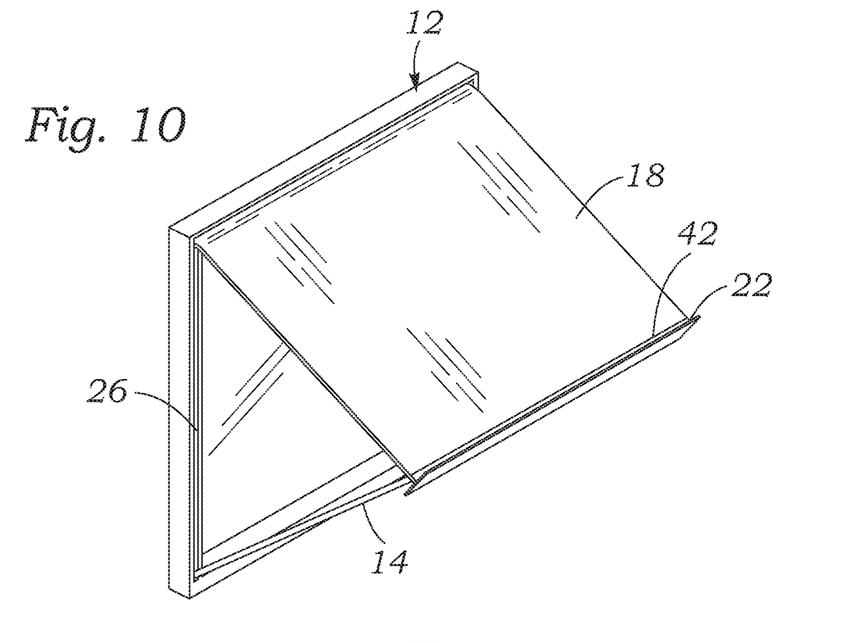
FIG. 10 is a perspective view of the awning assembly of FIG. 9 with a cover coupled to the cross member extending between the two support arms.
Figure 11:
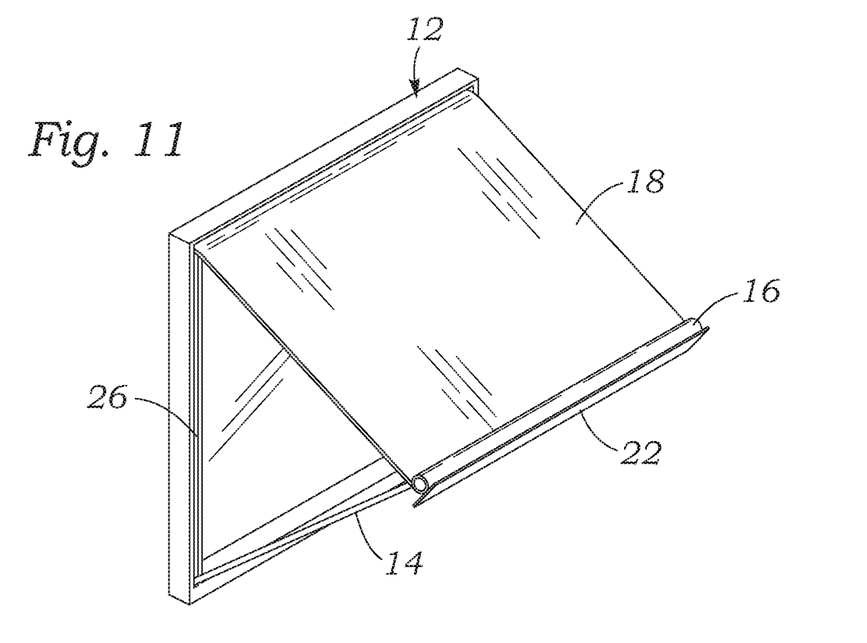
FIG. 11 is a perspective view of an alternative embodiment of the awning assembly of FIG. 8 with a cover connected to the shaft.

FIG. 10 illustrates another embodiment of the assembly 10 similar to FIG. 9 in which the shaft 16 is mounted inside the recessed portion 24, and the outermost longitudinal edge of the awning 18 is secured to the cross member 42 positioned between the second end portions of the support arms 14. The cover 22 can also be coupled to the cross member 42 such that the cover moves away from the vehicle wall with the cross member 42 when the awning 18 is extended. FIG. 11 illustrates an alternative embodiment of the assembly of FIG. 8, in which the shaft 16 extends between the support arms 14 and the cover 22 is coupled to the shaft 16 and is movable toward and away from the frame 12 with the shaft.

Figures 12A, 12B:
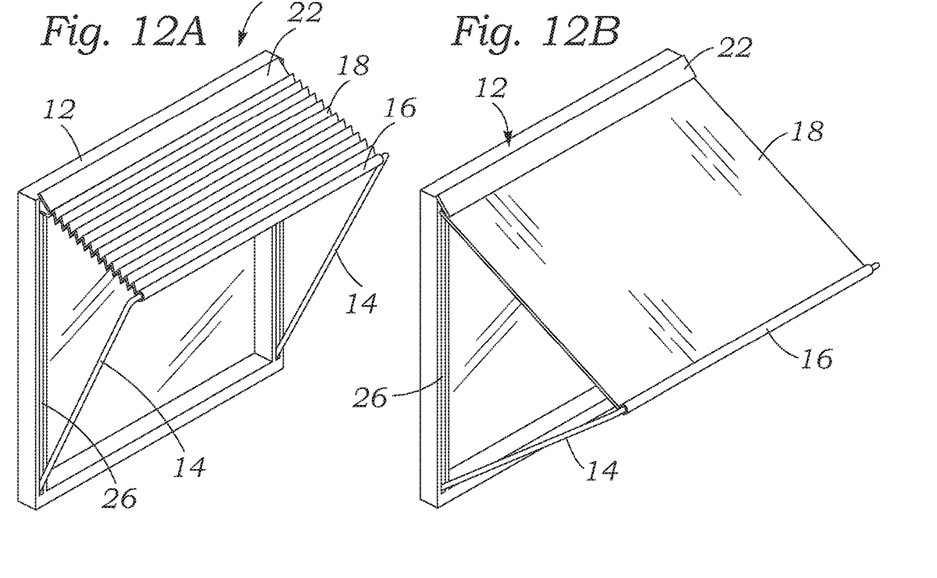
FIGS. 12A and 12B illustrate the awning assembly of FIG. 1 wherein the awning is folded or creased such that it can be collapsed inside the recess of the frame in the retracted position.

FIGS. 12A and 12B illustrate another embodiment of the assembly 10 wherein the awning 18 is folded or creased such that it is collapsible in the manner of an accordion. In the embodiment of FIGS. 12A-12B, one longitudinal edge of the awning 18 can be secured inside the recessed portion 24, and the other longitudinal edge can be secured to the shaft 16, which can be positioned between the support arms 14.

Figure 13:
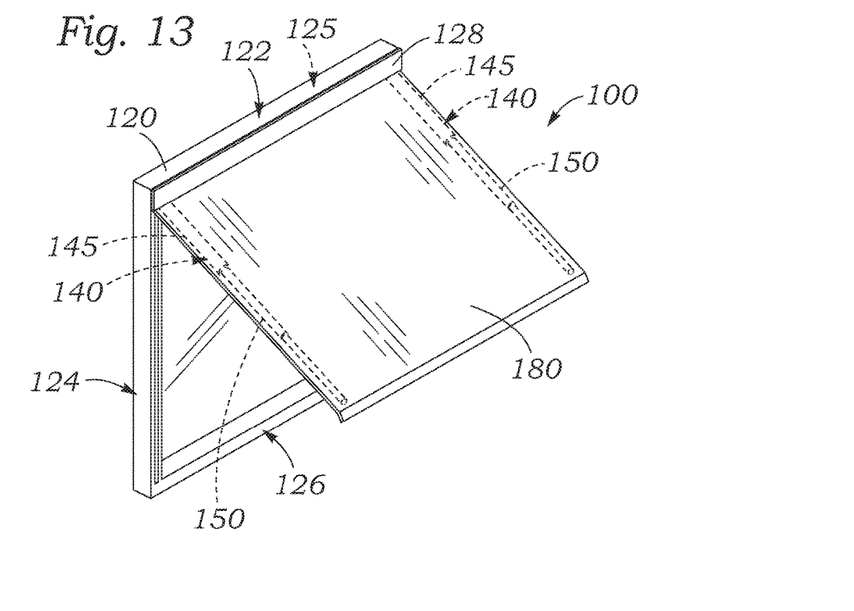
FIG. 13 is a perspective view of another embodiment of an awning assembly including support arms disposed along side portions of the awning.

FIG. 13 illustrates another embodiment of an awning and window frame assembly 100 including a frame 120 having an upper 122, two side portions 124, and a lower portion 126. The upper portion 122 can define a recessed portion indicated at 125. An awning 180 is mounted in the recessed portion 125 and movable between an extended position and retracted position, in which the awning is rolled-up or collapsed inside the recessed portion 125. A cover 128 can extend over the recess 125, and can be hinged or fixedly secured to the upper portion 122 of the frame, as desired. The assembly can include two support arms indicated in phantom at 140 positioned along the sides of the awning 180 and beneath the awning. The support arms 140 can have respective first end portions 145 secured within the recess 125, and can be extendable from the recess 125 in order to move the awning between the extended and retracted positions. For example, in the illustrated embodiment, the support arms 140 can include one or more portions or segments 150 that are telescopically movable such that the support arms can be lengthened and shortened to extend and retract the awning 180. In other configurations, the material of the awning 180 can be rigid or semi-rigid, such that the awning can be self-supporting in the extended position, and the assembly need not include support arms. In still other embodiments, the awning 180 can be folded or creased in the manner of FIGS. 12A-12B such that the awning can be in a collapsed configuration when received in the recess 125.

Figure 14:
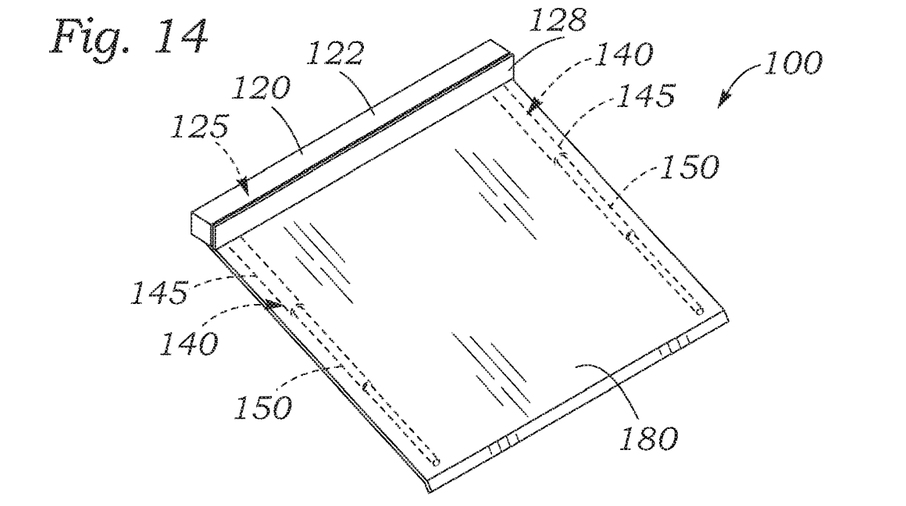
FIG. 14 is a perspective view of another embodiment of an awning assembly including a housing and support arms disposed along side portions of the awning.

FIG. 14 illustrates another embodiment of the awning assembly 100 wherein the frame includes only the upper portion 122 configured as a housing. The housing 122 can define the recess 125 in which the awning 180 is received. In this configuration, the housing 122 can be installed, for example, above a window, door, etc., and can be separate from a frame of the window or door.

Figure 15:
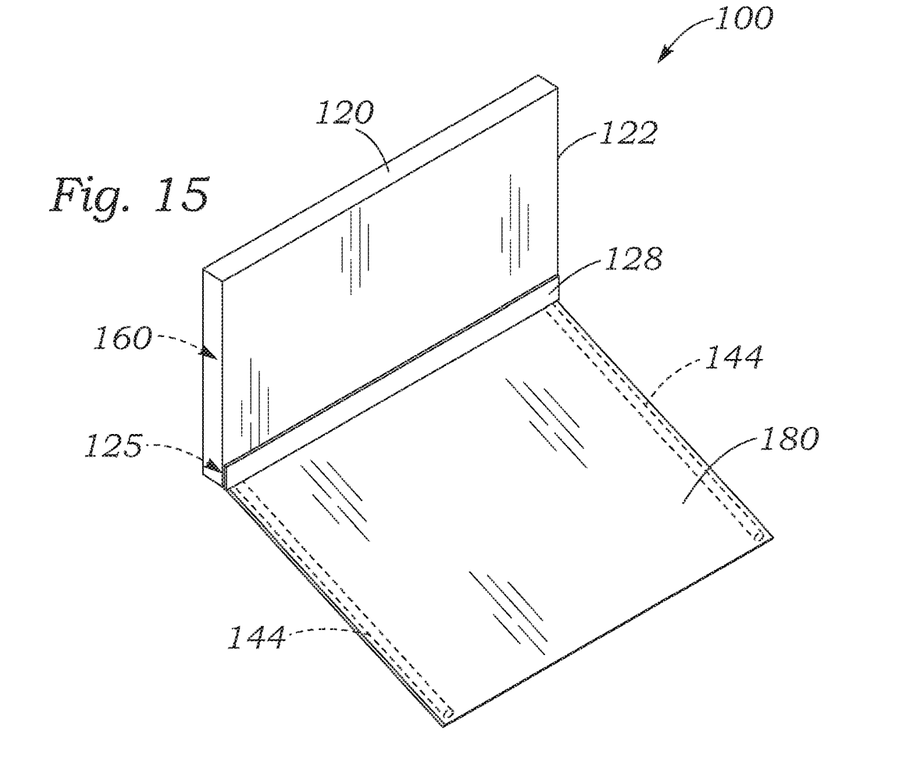
FIG. 15 is a perspective view of another embodiment of the awning assembly of FIG. 14 wherein the housing defines a cavity extending above the awning.

FIG. 15 illustrates another configuration of the assembly 100 in which the housing 122 is enlarged and defines an interior cavity 160 in communication with the recessed portion 125. The housing 120 can be disposed, for example, in a vehicle wall such that the cavity 160 extends upwardly within the vehicle wall. The cavity 160 can be sized to receive the awning 180 in an unrolled configuration. The cavity 160 can also be sized to receive support arms 144, and/or other components or mechanisms associated with the assembly. In some embodiments, the support arms 144 can be suitably flexible such that they can bend around the opening of the recess 125 and transition from a vertical orientation inside the cavity 160 when the awning is retracted to a substantially horizontal orientation outside the opening of the recess 125 when the awning is extended. Alternatively, the support arms 144 can be telescoping, similar to the arms 140 of FIG. 14.

In some embodiments, the awning can be made from a soft material, or a relatively rigid or semi-rigid material, and can be configured to be rolled up, folded, slid, stacked, flexed, or inflated between the retracted and extended configurations. For example, in some embodiments the awning can be made from any of various natural or synthetic fibers or fabrics, such as canvas, vinyl fabrics, acrylic fabrics, polyamides (e.g., nylon), etc. The awning can also be made from any of various polymeric or metallic sheet stocks, such as polycarbonate, sheet metal (e.g., aluminum, steel, etc.), vinyl, polyesters, ultra-high molecular weight (UHMW) polyethylene, acrylonitrile butadiene styrene (ABS), polyethylene terephthalate (PET), polyethylene terephthalate glycol-modified (PETG), etc. In some embodiments, the awning can be sufficiently strong such that it can support its own weight in the extended position without support arms.

In alternative embodiments, the awning can be disposed in the recessed portion in a collapsed configuration, and one or both of the support arms can be configured to pivot horizontally out of the recessed portion to unfurl or extend the awning. For example, one side portion of the awning can be secured within the recess, and the opposite side portion can be connected to a horizontally pivotable support arm operable to pivot horizontally out of the recess to unfurl or extend the awning.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only preferred examples and should not be taken as limiting the scope of the disclosure. Rather, the scope of the disclosure is defined by the following claims.

What is claimed is:

1. An awning assembly comprising:
a frame comprising a first side portion, a second side portion, and an upper portion extending between the first and second side portions,
and a lower portion extending between the first and second side portions opposite the upper portion,
the upper portion comprising a first recessed portion defined in the upper portion, the first side portion comprising a second recessed portion defined in the first side portion, the second side portion comprising a third recessed portion defined in the second side portion, the first recessed portion being in communication with the second recessed portion and with the third recessed portion such that the first, second, and third recessed portions form a continuous U-shaped recess that extends from the first side portion, along the upper portion, to the second side portion of the frame;
first and second support arms having first end portions pivotably mounted within the recess;
a shaft; and
an awning supported on the shaft, wherein the first and second support arms have second end portions connected to the awning or to the shaft;
wherein the awning is movable by the support arms between a retracted position and an extended position, wherein when the awning is in the retracted position, the awning is in a rolled-up or collapsed configuration and the second end portions of the support arms and the awning are disposed within the recess, and wherein when the awning is moved from the retracted position to the extended position, the second end portions of the support arms pivot out of the recess in a direction toward the lower portion of the frame and unfurl the awning.

2. The assembly of claim 1, further comprising a cover extending over at least a portion of the recess, wherein the awning is disposed behind the cover when the awning is in the retracted position.

3. The assembly of claim 2, wherein the cover is pivotably mounted to the frame such that the cover can pivot away from the frame when the awning is being moved from the retracted position to the extended position.

4. The assembly of claim 1, wherein the shaft comprises opposite end portions rotatably connected to the second end portions of the support arms, the awning is in a rolled-up configuration around the shaft when the awning is in the retracted position, and the awning has a longitudinal edge that is fixedly secured inside of the recess.

5. The assembly of claim 4, further comprising a cover secured to the shaft and movable therewith away from the frame when the awning is moved to the extended position.

6. The assembly of claim 1, wherein the shaft comprises opposite end portions rotatably mounted to the frame inside of the recess, the awning is in a rolled-up configuration around the shaft when the awning is in the retracted position, and the awning has a longitudinal edge that is fixedly secured to the second end portions of the support arms.

7. The assembly of claim 1, further comprising a cross member extending between the support arms, and a cover secured to the cross member such that the cover is movable with the cross member away from the frame when the awning is moved to the extended position.

8. The assembly of claim 1, wherein the awning comprises creases or folds such that the awning is collapsible in the manner of an accordion when in the retracted position.

9. The assembly of claim 1, further comprising a window pane mounted within the frame.

10. The assembly of claim 1, wherein the awning is movable between the retracted position and the extended position by one or more electric motors housed in the frame.

11. A vehicle including the awning assembly of claim 1.

12. A vehicle, comprising:
a wall; and
an awning assembly incorporated into the wall of the vehicle, the awning assembly comprising:
a frame comprising a U-shaped recess;
first and second support arms having first end portions pivotably mounted within the recess;
a shaft; and
an awning supported on the shaft, wherein the first and second support arms have second end portions connected to the awning or to the shaft;
wherein the awning is movable by the support arms between a retracted position and an extended position, wherein when the awning is in the retracted position, the awning is in a rolled-up or collapsed configuration and the second end portions of the support arms and the awning are disposed within the recess, and wherein when the awning is moved from the retracted position to the extended position, the second end portions of the support arms pivot out of the recess and unfurl the awning; and
wherein a front surface of the frame is substantially flush with an exterior surface of the vehicle wall.

13. A method, comprising:
installing an awning assembly in a wall of a vehicle, the awning assembly including:
a frame comprising a U-shaped recess;

first and second support arms having lower end portions pivotably mounted within the recess; and
a shaft;
an awning supported on the shaft, wherein the first and second support arms have upper end portions connected to the awning or to the shaft;
wherein the awning is movable by the support arms between a retracted position and an extended position, wherein when the awning is in the retracted position, the awning is in a rolled-up or collapsed configuration and the upper end portions of the support arms and the awning are disposed within the recess, and wherein when the awning is moved from the retracted position to the extended position, the upper end portions of the support arms pivot out of the recess and unfurl the awning; and
wherein the awning assembly is incorporated into the wall of the vehicle such that a front surface of the frame is substantially flush with an exterior surface of the vehicle wall.

14. The vehicle of claim 12, wherein:
the frame further comprises a first side portion, a second side portion, and an upper portion extending between the first and second side portions; and
the U-shaped recess extends from the first side portion, along the upper portion, to the second side portion.

15. The vehicle of claim 14, wherein:
the U-shaped recess further comprises a first recessed portion defined in the upper portion of the frame, a second recessed portion defined in the first side portion of the frame, and a third recessed portion defined in the second side portion of the frame; and
the first recessed portion is in communication with the second recessed portion and the third recessed portion such that the U-shaped recess is continuous along the first side portion, the upper portion, and the second side portion of the frame.

16. The awning assembly of claim 1, wherein the second and third recessed portions have depths greater than the first and second support arms such that when the awning is in the retracted position, the first and second support arms are completely within the second and third recessed portions and do not extend beyond an outer surface of the frame.

17. The awning assembly of claim 1, wherein:
the first end portion of the first support arm is pivotably mounted with the second recessed portion of the first side portion of the frame; and
the first end portion of the second support arm is pivotably mounted within the third recessed portion of the second side portion of the frame.

18. The awning assembly of claim 1, wherein:
the first side portion, the second side portion, and the upper portion of the frame at least partially define an area of the frame configured to receive a window pane; and
the U-shaped recess at least partially surrounds the area of the frame configured to receive a window pane.

19. The vehicle of claim 12, wherein when the awning is in the retracted position, neither the shaft, nor the awning, nor the first or second support arms extend beyond the exterior surface of the vehicle wall.

* * * * *

UNITED STATES PATENT AND TRADEMARK OFFICE
CERTIFICATE OF CORRECTION

PATENT NO. : 10,077,559 B2
APPLICATION NO. : 15/179586
DATED : September 18, 2018
INVENTOR(S) : Chase et al.

Page 1 of 1

It is certified that error appears in the above-identified patent and that said Letters Patent is hereby corrected as shown below:

On the Title Page

Insert:
--Related U.S. Application Data
(60) Provisional application no. 62/174,438, filed on June 11, 2015.--

Signed and Sealed this
Nineteenth Day of January, 2021

Andrei Iancu
*Director of the United States Patent and Trademark Office*